April 7, 1959
I. S. LAWSON
2,880,478
COMPOSITE MOLDING
Filed Nov. 2, 1955
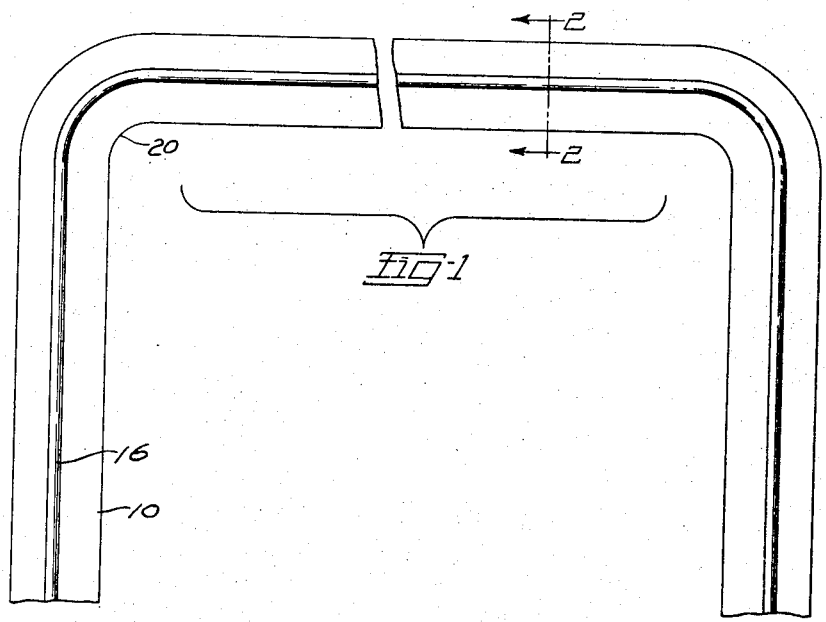
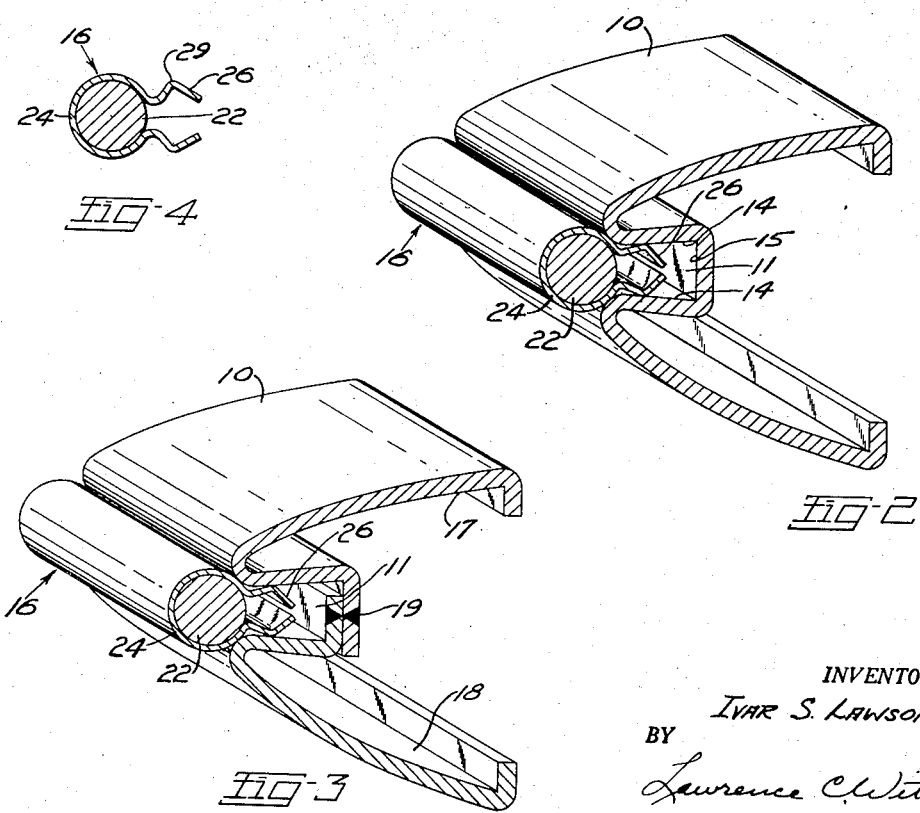
INVENTOR.
IVAR S. LAWSON
BY
Lawrence C. Witker
ATTY.

United States Patent Office 2,880,478
Patented Apr. 7, 1959

2,880,478

COMPOSITE MOLDING

Ivar S. Lawson, Ashville, N.Y.

Application November 2, 1955, Serial No. 544,495

4 Claims. (Cl. 20—74)

This invention relates to composite molding strips and is particularly directed to a novel combination of a channelled metallic molding and an ornamental trim bead that serves to cover the channel or to conceal the joint in the case of a two part molding.

A primary object of the invention is to provide a longitudinally channelled molding with a trim bead to conceal the channel and at the same time add materially to the ornamental appearance of the molding, such bead consisting of a core and a cover therefor provided with attaching flange portions capable of retaining the bead in assembled relation with the molding by the frictional contact between the attaching portions and the side walls of the channel.

Further objects and advantages of the invention will become apparent from a study of the following description when taken in connection with the accompanying drawings intended to be illustrative rather than restrictive and in which:

Figure 1 is fragmentary front view of the composite molding of the present invention;

Figure 2 is a sectional detail view of the composite bead and molding taken substantially on a line 2—2 of Figure 1;

Figure 3 is a view similar to Figure 2 but showing the molding body as formed of two parts; and Figure 4 is a sectional detail view through the trim bead prior to assembly with the molding.

With particular reference to Figure 1 of the drawing, the molding of the present invention is particularly adapted to be used for the ornamentation of cabinets such as are used to house television sets. Such cabinets have openings to receive the picture tube and the joint between the tube and the cabinet is generally covered by a suitable molding. It is frequently desirable to produce such moldings with right angle bends to conform with the corners of the openings, and the present composite molding is particularly adapted to be so bent.

The molding of the invention consists primarily of a metal base or body portion 10 longitudinally formed as by cold rolling to provide a channel 11 length-wise thereof, the channel being formed with side walls 14 and bottom wall 15. The body 10 is roll formed from a strip or ribbon of metal such as mild steel, as such rolling process readily and quickly produces moldings of desired cross-section. As shown in Figure 2, the channel 11 may be rolled in a molding formed from a single metal ribbon, it being noted that the side walls 14 converge slightly toward the open side of the channel. It may be preferable to independently form two lengthwise sections of molding 17 and 18 and subsequently secure them together as by welding at 19, as shown in Figure 3. The separate formation of the two halves of the main portion 10 of the molding is desirable in some cases because of the necessity of forming a substantially right angle bend 20 at several places in the molding to fit an opening in a television cabinet with which it is used. It has been found more convenient to bend the two halves of the molding separately and subsequently secure them together. After the body 10 has been secured together the trim bead 16 is pressed into the channel 11 of the body and frictionally retained therein as hereinafter described.

The trim bead 16 is preferably fabricated in two parts, an inner member or core 22 of suitable ductile metal which serves as a mandrel about which an outer cover or sheath 24 may be formed, such as by roll forming. With particular reference to Figure 4 of the drawings it will be noted that the cover 24 does not completely enclose the core 22, the edge portions of the strip from which the cover 24 is formed being extended laterally or outwardly from the core in generally parallel relation to provide a pair of spaced longitudinally extending flange members 26 which are preferably bowed at 29 to render them capable of resiliently engaging the side walls 14 of the channel 11 in the body member. When a round wire core is used, the sheet or strip metal cover is bent upon itself to form a tubular or cylindrical ball or bead portion. The core 22 may be of other cross-section in which case the ball or bead portion may not be a true cylinder, the term "ball" being intended to embrace other than round cross-sections. The metal from which the cover 24 is formed is preferably brass having a certain amount of resiliency and which for ornamental purposes is a contrasting color to that of the body member. The manner of attaching the bead is clearly illustrated in Figures 2 and 3 where it will be noted that the bowed flanges 26 of the bead are in effect snapped into the channel to be retained therein because of the resiliency provided in the flanges, and also by providing the walls of the channel with a slight back-draft which produces a channel slightly narrower at the opening than at the bottom thereof. The use of a ductile metallic core enables the covered bead to be readily bent longitudinally to conform to the bends 20 provided in the body portion. Further, the core maintains the cross-section of the bead at the bend, it being clear that without a core the formed bead would collapse upon being bent.

It is believed to be apparent from the foregoing that the moldings herein provided can be economically manufactured and installed and that its all metal construction furnishes a permanent molding that will be long lasting and require no subsequent servicing. While it primarily serves as an ornamental or decorative addition to a television cabinet, for example, it also has utility in retaining the component parts of the television set in assembled relation with respect to the cabinet.

What I claim is:

1. A molding comprising a body consisting of a pair of formed metal sections longitudinally joined together so as to provide a channel having converging side walls therein, a metal trim bead having a tubular ball portion and spaced longitudinally extending and outwardly bowed flange portions providing elongated projections for frictionally engaging the side walls of the channel, and a core in said ball portion extending throughout the length thereof, said core being adapted to maintain said bead in any desired bent position.

2. A molding comprising a body consisting of formed metal sections longitudinally joined together, a channel in said body having converging side walls, and a metal trim bead having a tubular ball portion overlying said channel and spaced longitudinally extending laterally bowed flange portions projecting into said channel and frictionally engaging the side walls of the channel, and a core in said ball portion extending throughout the length thereof, said core being adapted to maintain the cross-section of said bead substantially uniform.

3. A metallic trim bead for assembly with a structure provided with a channel having spaced side walls converging toward the open side of the channel, said bead consisting of a metal strip formed with a cylindrical bead portion intermediate its edges which are disposed laterally therefrom to provide depending flanges, said flanges being bowed to provide longitudinal projections to frictionally engage the side walls of the channel, and a core in said cylindrical bead extending throughout the length thereof, said core being ductile to maintain the cross-section of the bead uniform.

4. A metallic trim bead for assembly with a supporting structure, said bead consisting of a metal strip formed with a symmetrical bead portion intermediate its edges which edges are disposed laterally therefrom to provide depending flanges, said flanges being initially flared outwardly so as to be compressed toward each other into engagement with the supporting structure upon assembly, and a metallic core about which said bead portion is formed extending throughout the length of said bead, said core being ductile to maintain the cross-section of the bead uniform.

References Cited in the file of this patent

UNITED STATES PATENTS

| | | |
|---|---|---|
| 1,708,063 | Howard | Apr. 9, 1929 |
| 1,800,609 | Drake | Apr. 14, 1931 |
| 2,116,846 | Pilcher | May 10, 1938 |
| 2,316,035 | Westrope | Apr. 6, 1943 |

FOREIGN PATENTS

| | | |
|---|---|---|
| 4,511 | Australia | Nov. 3, 1926 |
| 381,156 | Great Britain | Sept. 23, 1932 |
| 634,256 | Great Britain | Mar. 15, 1950 |